(12) United States Patent
Davis et al.

(10) Patent No.: US 9,224,292 B2
(45) Date of Patent: Dec. 29, 2015

(54) METHOD FOR CONTROLLING A COMPUTING DEVICE OVER EXISTING BROADCAST MEDIA ACOUSTIC CHANNELS

(71) Applicant: Kerry L. Davis, San Jose, CA (US)

(72) Inventors: Kerry L. Davis, San Jose, CA (US); Karl Baehr, Salem, MA (US)

(73) Assignee: Kerry L. Davis, San Jose, CA (US)

( * ) Notice: Subject to any disclaimer, the term of this patent is extended or adjusted under 35 U.S.C. 154(b) by 435 days.

(21) Appl. No.: 13/750,414

(22) Filed: Jan. 25, 2013

(65) Prior Publication Data
US 2014/0088975 A1    Mar. 27, 2014

Related U.S. Application Data

(60) Provisional application No. 61/704,223, filed on Sep. 21, 2012.

(51) Int. Cl.
*G06Q 20/18*    (2012.01)
*G10L 19/008*   (2013.01)
*H04W 12/02*    (2009.01)
*G08C 23/02*    (2006.01)

(52) U.S. Cl.
CPC .............. *G08C 23/02* (2013.01); *H04W 12/02* (2013.01)

(58) Field of Classification Search
CPC ....... H04W 12/02; G08C 23/02; G06Q 20/18; G10L 19/008
USPC .................... 704/500; 381/82; 705/18, 71, 72
See application file for complete search history.

(56) References Cited

U.S. PATENT DOCUMENTS

| | | | | |
|---|---|---|---|---|
| 6,526,034 B1* | 2/2003 | Gorsuch | ............... | H04W 48/18 370/333 |
| 8,379,874 B1* | 2/2013 | Simon | ................... | H04R 27/00 381/1 |
| 8,499,342 B1* | 7/2013 | MacWan | ............. | H04L 63/0861 713/168 |
| 8,711,656 B1* | 4/2014 | Paulson | ............... | H04B 7/2603 367/135 |
| 8,711,732 B2* | 4/2014 | Johnson | ................... | H04W 4/22 370/259 |
| 2010/0227610 A1* | 9/2010 | Jabara | ..................... | G06Q 10/10 455/432.3 |
| 2010/0268540 A1* | 10/2010 | Arshi | ...................... | G06Q 30/02 704/500 |
| 2012/0239407 A1* | 9/2012 | Lynch | ................. | G06Q 30/0201 704/500 |
| 2013/0024308 A1* | 1/2013 | Ramaswamy | ........ | G07G 1/0081 705/18 |
| 2014/0244514 A1* | 8/2014 | Rodriguez | ............. | G06Q 20/10 705/71 |
| 2015/0125013 A1* | 5/2015 | Secall | .................... | G10L 19/167 381/315 |
| 2015/0154597 A1* | 6/2015 | Bacastow | ........... | G06Q 20/4012 705/72 |

* cited by examiner

*Primary Examiner* — Pierre-Louis Desir
*Assistant Examiner* — Seong-Ah A. Shin

(57) ABSTRACT

The present invention provides a method for broadcasting a control message across an existing broadcast transport medium such as TV, Radio, Webcasts, Smart Phones/Tablets, Audio Buttons/Toys and PA/audio systems via a common acoustic channel with normal traditional broadcasts over those mediums to control computing devices, especially smart mobile devices such as smart phones or tablets. The present invention also involves a method for encoding the control message onto an acoustic wave composed of active sinusoidal frequency components selected out of monitored possible frequencies according to the concept of mathematical combinations. This encoding method is aimed at using a minimum amount of transmitted energy to get a maximum amount of data with as little reflective noise as possible.

17 Claims, 10 Drawing Sheets

| Enumerated value | Monitored Frequencies | | | | | | | |
|---|---|---|---|---|---|---|---|---|
| | 1 | 2 | 3 | 4 | 5 | 6 | 7 | 8 |
| 1 | ON | OFF | OFF | OFF | ON | OFF | OFF | OFF |
| 2 | ON | OFF | OFF | OFF | OFF | ON | OFF | OFF |
| 3 | ON | OFF | OFF | OFF | OFF | OFF | ON | OFF |
| 4 | ON | OFF | OFF | OFF | OFF | OFF | OFF | ON |
| 5 | OFF | ON | OFF | OFF | ON | OFF | OFF | OFF |
| 6 | OFF | ON | OFF | OFF | OFF | ON | OFF | OFF |
| 7 | OFF | ON | OFF | OFF | OFF | OFF | ON | OFF |
| 8 | OFF | ON | OFF | OFF | OFF | OFF | OFF | ON |
| 9 | OFF | OFF | ON | OFF | ON | OFF | OFF | OFF |
| 10 | OFF | OFF | ON | OFF | OFF | ON | OFF | OFF |
| 11 | OFF | OFF | ON | OFF | OFF | OFF | ON | OFF |
| 12 | OFF | OFF | ON | OFF | OFF | OFF | OFF | ON |
| 13 | OFF | OFF | OFF | ON | ON | OFF | OFF | OFF |
| 14 | OFF | OFF | OFF | ON | OFF | ON | OFF | OFF |
| 15 | OFF | OFF | OFF | ON | OFF | OFF | ON | OFF |
| 16 | OFF | OFF | OFF | ON | OFF | OFF | OFF | ON |

FIG. 7

|  | Monitored Frequencies | | | | | | | |
|---|---|---|---|---|---|---|---|---|
| Enumerated value | 1 | 2 | 3 | 4 | 5 | 6 | 7 | 8 |
| 1 | ON | ON | OFF | OFF | OFF | OFF | OFF | OFF |
| 2 | ON | OFF | ON | OFF | OFF | OFF | OFF | OFF |
| 3 | ON | OFF | OFF | ON | OFF | OFF | OFF | OFF |
| 4 | ON | OFF | OFF | OFF | ON | OFF | OFF | OFF |
| 5 | ON | OFF | OFF | OFF | OFF | ON | OFF | OFF |
| 6 | ON | OFF | OFF | OFF | OFF | OFF | ON | OFF |
| 7 | ON | OFF | OFF | OFF | OFF | OFF | OFF | ON |
| 8 | OFF | ON | ON | OFF | OFF | OFF | OFF | OFF |
| 9 | OFF | ON | OFF | ON | OFF | OFF | OFF | OFF |
| 10 | OFF | ON | OFF | OFF | ON | OFF | OFF | OFF |
| 11 | OFF | ON | OFF | OFF | OFF | ON | OFF | OFF |
| 12 | OFF | ON | OFF | OFF | OFF | OFF | ON | OFF |
| 13 | OFF | ON | OFF | OFF | OFF | OFF | OFF | ON |
| 14 | OFF | OFF | ON | ON | OFF | OFF | OFF | OFF |
| 15 | OFF | OFF | ON | OFF | ON | OFF | OFF | OFF |
| 16 | OFF | OFF | ON | OFF | OFF | ON | OFF | OFF |
| 17 | OFF | OFF | ON | OFF | OFF | OFF | ON | OFF |
| 18 | OFF | OFF | ON | OFF | OFF | OFF | OFF | ON |
| 19 | OFF | OFF | OFF | ON | ON | OFF | OFF | OFF |
| 20 | OFF | OFF | OFF | ON | OFF | ON | OFF | OFF |
| 21 | OFF | OFF | OFF | ON | OFF | OFF | ON | OFF |
| 22 | OFF | OFF | OFF | ON | OFF | OFF | OFF | ON |
| 23 | OFF | OFF | OFF | OFF | ON | ON | OFF | OFF |
| 24 | OFF | OFF | OFF | OFF | ON | OFF | ON | OFF |
| 25 | OFF | OFF | OFF | OFF | ON | OFF | OFF | ON |
| 26 | OFF | OFF | OFF | OFF | OFF | ON | ON | OFF |
| 27 | OFF | OFF | OFF | OFF | OFF | ON | OFF | ON |
| 28 | OFF | OFF | OFF | OFF | OFF | OFF | ON | ON |

FIG. 8

METHOD FOR CONTROLLING A COMPUTING DEVICE OVER EXISTING BROADCAST MEDIA ACOUSTIC CHANNELS

The current application claims a priority to the U.S. Provisional Patent application Ser. No. 61/704,223 filed on Aug. 21, 2012.

FIELD OF THE INVENTION

The present invention generally relates to a method for controlling a computing device over existing broadcast media acoustic channels, and more particularly, relates to a method for simplified secure mobile wireless communication and control of a computing device using commonly existing audio infrastructure at public or private venues.

BACKGROUND OF THE INVENTION

Existing broadcast mediums exist in society for purposes of news and entertainment. These mediums include various forms of digital and analog Radio, TV, Web, Public Address and even audible toys or buttons. Also, sound modulation is one of the oldest modulation methods for wireless and wired communication known to human beings, from the beating of a drum, to SONAR, to the now antiquated high speed modems. Audio was the medium of choice for digital modulation used to forge a path for the internet. Sound, and in general low frequency audible sound, has been used for man to man, man to machine and machine to machine communications. However, the capability of high frequency bidirectional acoustic transmission has only recently been made widely available in smart mobile appliances (e.g. smart phones and tablets) because of the widespread CD and DVD audio qualities of 44.1 KHz and 48 KHz sample rates rather than the more typical 8 KHz audio capability found in prior mobile equipments. With the introduction of smart mobile appliances capable of high frequency bidirectional acoustic transmission, using high frequency sound outside human hearing range as a digital modulation carrier for communication may be a software only solution that piggybacks off of the audio capabilities required for other mainstream services accomplished on the smart mobile appliances, and thus become a potential approach for communication and control of the appliances as an addition or alternate to the commonly used RF wireless modulation.

Several existing applications have been written to identify a song or an advertisement using a smart phone to first record a small portion of the audio from the song or advertisement, which is then sent to a database in the Internet cloud for comparison and matching of the lower frequency audio using pattern matching techniques (aka Fingerprinting). However, the inventor of this current invention realizes that there is value in many markets requiring not only identification of the audio being played but also the location and even the time associated with the reception of the audio by extracting digital information embedded purposefully in the high frequency portions of these broadcasts. This purposefully embedded digital in-band messaging may be applied to mark a specific location in the broadcast and/or relay usable information to control a smart mobile appliance or otherwise add or improve user experience.

Some applications have opted for the use of scanning of QR or other bar codes and in some cases, the use of NFC or RFID technology for location based services. Yet those skilled in the art can easily recognize the inherent difficulties either in the additional hardware requirements associated with RFID/NFC technology and the point/focus and lighting problems of using bar code technologies to obtain information. Further, both bar code scanning and NFC/RFID, while arguably more secure than credit cards, offer little in the way of advanced payment security, because advanced security requires real time intelligence on both sides of the transaction which is lacking in both of these competing technologies.

In contrast, using digital in-band messaging purposefully embedded in existing high frequency acoustic signals may be a simple and more secure approach to remotely control mobile communication devices. Therefore, one objective of the current invention is to accomplish this approach. In order to implement the embedded digital in-band messaging via a sound channel, effective digital encoding is needed. Digital encoding of a signal over a wave carrier (light, sound or radio) in an open environment presents many problems due to signal reflection, which can seriously attenuate the signal resulting in transmission errors and the need for complex transmitters, receivers and software drivers. Many ingenious and complex methods have been invented over the years to compensate and/or recover a signal in these environments. These methods apply mostly to the transmissions of relatively large amounts of dynamic data and mostly over radio transmissions that are undeniably useful for the purposes intended.

However, especially with the increased usage of smart mobile devices, it is believed that the need for small amounts of data bursts or continuous beacons of digital transmission is, and will increasingly be, more useful. Unfortunately, there has not been a lot of innovation in providing methods for efficiently transmitting digital information in continuous beacons to maximize efficiency and payload while minimizing complexity. This is especially true with respect to highly reflective wave transmission using digitally modulated acoustics. In contrast, acoustic digital modulation, using smart mobile devices, represents major advantages with respect to already deployed infrastructure, development cost and customer experience. Further advantages exist while using a continuous transmission envelope rather than time/space modulated message header in both radio and acoustic mobile applications for indoor location.

Therefore, another objective of the current invention is to provide an encoding method for transmission of relatively small amounts of data in a continuous or repeated manner via existing sound channel, while using as little transmission energy as possible and thus reducing development cost and increasing transmission speeds.

SUMMARY OF THE INVENTION

The present invention provides a process for broadcasting a control signal across an existing broadcast transport medium such as TV, Radio, Webcasts and PA/audio systems via a common acoustic channel with normal traditional broadcasts over those mediums to control computing devices, especially smart mobile devices such as smart phones or tablets.

In one aspect, the present invention provides a particular method for transmitting a digital acoustically modulated signal to control computing devices but does not intend to specify the exact form of embedded signal modulation in the audio, but rather a method of widespread deployment of information and the ease of processing of multiple types of secure mobile transactions, which has only recently been made possible with the combination of global use of smart phones by the consuming public and high fidelity audio systems in most public and private venues.

The method used by this invention involves either the prerecorded or real time overlay of in-band digitally modulated and or steady pulse digital beacon signals into public broadcast media (TV, Radio, Web) and retail or nonretail audio infrastructure for the purpose of general location and even proximity specific control of smart mobile devices. The information transmitted may include but is not limited to, direct or indirect identification (via cloud or local database lookup) of the audio source itself, the location of the broadcast transmitter, context/content or location relevant data including information needed to invoke another relevant application or URL, date and/or time of the broadcast, secure authentication information, advertising, coupons or any variety of other information deemed useful for the owner of the broadcast equipment to pass to the mobile public or patrons authorized to be at this location with a mobile participating device.

Using the current invention, many of these mediums are capable of simultaneously transmitting control signals to smart devices such as smart phones and tablets without any significant or no changes to the existing broadcast transport medium. This provides for a unique opportunity for Venue Owners, Advertisers and Broadcasters to easily reach a very large audience of mobile smart device clients with very little or no infrastructure changes or increased cost of system ownership.

Regarding the current invention, there are several specific advantages by using the existing infrastructure.

First, it is recognized that sound generation and reception is by far the most common and inexpensive form of wave transport being ubiquitous across the modern world with very common standards of transmission. This fact greatly lowers the cost of distribution and ownerships for the system. Further, while it is possible to modulate digital sound in band with analog sound, and more importantly, possible and quite common to transport sound within nearly any other optical or electromagnetic carrier such are radio or TV transmission, it is impossible to transport radio or digital laser over a sound channel. Existing infrastructure include fiber optic data transport equipment, TV and Radio broadcast equipment, end user TV and Radio reception equipment, venue operated audio/video public address and sound equipment, etc. Where infrastructure doesn't exist, it can easily be deployed using off the shelf technologies such as smart tablet or smart phone devices with or without secure kiosk style enclosures already on the market and/or end user audio/visual equipment as listed above.

Second, the solution requires no new hardware or software drivers for the receiving smart phone mobile device. Almost any other form of radio modulation requires at minimum a hardware specific driver downloaded into the mobile device. Since the release of the second generation iPhone (i.e. iPhone3), almost all smart phones are capable of receiving and sending high frequency audio signals up to 24 KHz and have 44.1 to 48 KHz sampling capabilities. This fact allows for digital audio modulations outside the audio range of nearly every human at the volumes needed.

In another aspect, the present invention also involves a method for encoding and decoding a digital signal onto an acoustic wave using sinusoidal frequencies multiplexed into a single pulse arranged in mathematical combinations. This method is aimed at using a minimum amount of transmitted energy to get a maximum amount of data with as little reflective noise as possible.

Acoustic modulation is especially susceptible to reflective attenuation and signal cancellation. More active signal frequencies in the transmission equate to more opportunities for direct and indirect or reflective signal cancellation. The most basic and obvious encoding solution for a constantly transmitted or statically repeated encoding is to simply use a single frequency pulse to indicate a '1' bit and either a second (or somewhat worse, no) frequency to indicate a '0' bit. This solution is discarded because of the very limited nature of the amount of possible data to transmit in a narrow frequency band due to the requirement to activate one or possibly more frequencies for each bit transmission. Another option is to extrapolate on the existing DTMF methodology and use a dual tone array for encoding and decoding a signal to a larger integral value than the 16 possibilities offered with DTMF. This certainly allows for both fewer and a predictable number of active frequencies in the transmission. However, while only a single dual tone would need to be transmitted, one would have to pick those two tones out of an array of 256×256 (total 512) different frequencies to encode 16 bits of data (65535 combinations).

In contrast, according to the present invention, using the mathematical combination method would require only 4 active frequencies out of 37 possible frequencies (combin(37, 4)=66045>2^16) or 2 active frequencies out of 363 possible frequencies (combin(363,2)=65703>2^16), which is still better than the 2 active frequencies out of 512 possible frequencies needed using a DTMF type two dimensional array (or even N dimensional array to take DTMF to multiple dimensions).

The principle advantage of the current invention over table look-up methods used for DTMF, is that the current invention takes advantage of all combinations of the active frequencies at the expense of a more complicated conversion method as opposed to a partial set of combinations and a direct table index mapped to a digital value. When DTMF and MF schemes were first envisioned, processor speeds and memory were much slower and smaller respectively than with modern technology. The result being that the more complicated conversion method of multi-frequencies mapped to digital enumerated values used by the current invention over a direct table lookup is fairly trivial today yet yields a much larger range of enumerated values.

With the current invention, the advantage to the client of the invention is in the user experience. Smart phones and pads have become inundated with a plethora of applications that are often forgotten or difficult to find when needed. This invention benefits both the client and the server in that the client can keep a single application in the home row/page of their smart device and invoke that one application which will in turn take them automatically to the correct application OR service based on their current location while providing the venue provider or media advertiser a simple way to keep a connection between their virtual applications and the users real world needs (which are mainly location and event dependant). Other advantages to both client and server is the ability to distribute approved user information and demographics along with the event or location based invocation thus providing a more targeted and unique customer experience with potentially higher sales. Conceivably, multiple advertisers could use a single event or advertising channel, along with the user demographics, to target advertising more effectively.

Digitally modulated messages may be simply integrated in real time with prerecorded or live audio or embedded with prerecorded audio for later and possibly repeated transmission. This is unique in that the invention provides a method for digital communication over existing infrastructure made useful only because of now available, and widely distributed smart phone technology capable of receiving and demodulating these messages into a useful service. The author of this disclosure has reduced the capabilities introduced in this disclosure to practice in the form of working software and in some cases prototype hardware where necessary.

Further advantage of this method is that this invention requires no external software drivers and is agnostic to smart phone and smart pad hardware broadly available in today's market. This is not the case for many other functionally similar radio based solutions like BlueTooth, Wifi, NFC and RFID. None of which can be transmitted in-band across an existing broadcast medium today without considerable modifications in both hardware and software to both the transmitting and receiving equipment.

BRIEF DESCRIPTION OF THE DRAWINGS

Reference will now be made in detail to embodiments, examples of which are illustrated in the accompanying drawings, in which

FIG. 7 illustrates a 4×4 DTMF array enumeration, i.e. a table of active verses inactive frequencies using a common 4×4 DTMF modulation, wherein totally 16 enumerated values are represented by 2 active frequencies selected out of 8 possible frequencies;

FIG. 8 illustrates an example of a combin(8,2) enumeration, i.e. an enumeration of all 28 possible combinations of 2 active frequencies out of 8 possible frequencies according to the present invention;

DEFINITIONS AND ACRONYMS

Figure 1:
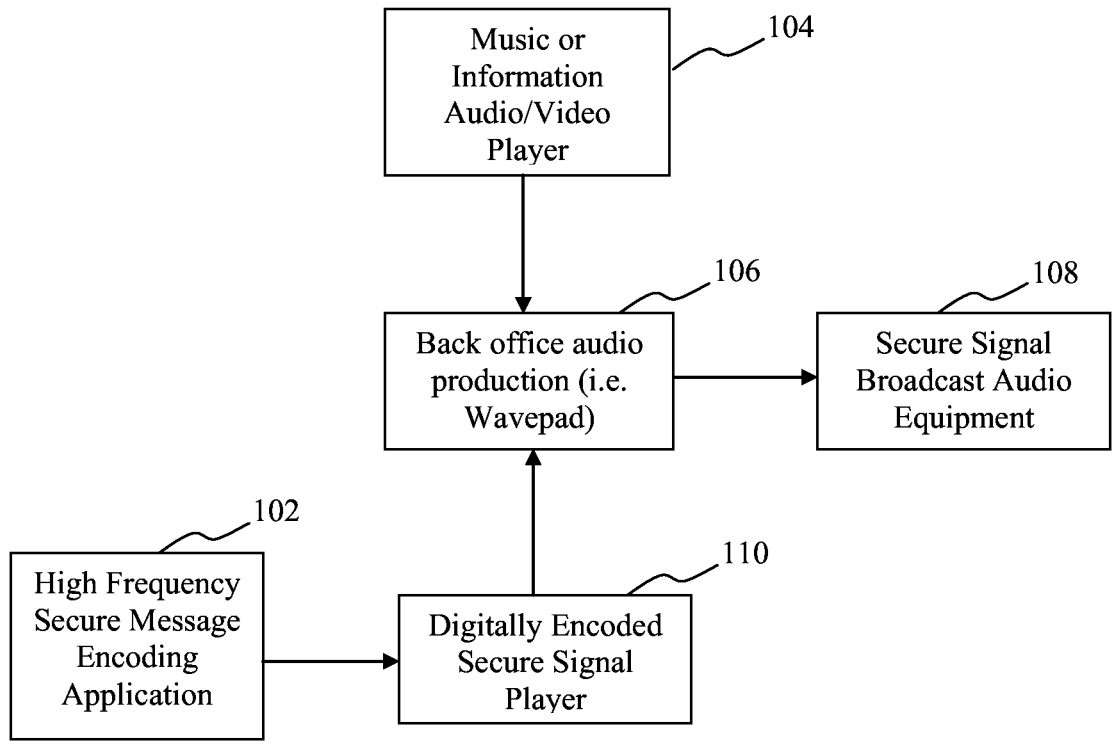
FIG. 1 illustrates an embodiment of embedding digitally modulated signals into prerecorded audio for later repeated broadcast according to the present invention.

Audio Fingerprinting—A commonly used method of digitally sampling a small portion of broadcast audio and matching that audio against a very large audio database in order to directly identify the broadcast (thus pairing the listener to the broadcast) and potentially, albeit indirectly, identify the particular broadcast channel and even possibly the listeners location.

Audio Watermarking—A method of communication between a broadcast and digital listener by which a digital signal is encoded directly into the broadcast audio preferably without the knowledge or any distraction to the human listener.

Broadcast Media—Any public media capable of acoustic or audio/video broadcast not normally used for in-band digital acoustic signaling for the purposes described in this current disclosure. Including but not limited to AM/FM/Digital Radio, all forms of Digital or Analog TV, LAN or WAN webcast, audio buttons or toys (e.g. Staples Easy Button).

In-band Signaling—The transfer of one or more channels carrying digital information embedded in an analog open air carrier signal which may or may not contain other forms of user valued audio (e.g. music, news, etc).

Smart Mobile Device/Appliance—Any of a number of common mobile devices capable of demodulating an audio signal. Common examples include but are not limited to Apple IOS (iPhone, iPad, iPod), Android, Blackberry and Windows Mobile operated devices.

Active Signal Encoding—Refers to the analog encoding of a digital signal using the presence of a signal (Active High) or the absence of a signal (Active Low). There are various methods of creating a signal including the presence or absence of a specific wave at a specific frequency and amplitude threshold and duration OR, in like manner, the presence or absence of an electrical voltage. Examples in this disclosure refer to the use of sound waves for signaling purposes. However, the exact method of signal generation is not critical to the transport protocol being claimed.

High Frequency—This is a relative term with respect to the underlying audible audio broadcast. While 4 KHz might normally be considered a low frequency audio signal, with respect to an AM radio broadcast that tops out at around 5 KHz and considering that the highest note on a piano is around 4 KHz, high frequency is relative to the broadcast medium when the discussion is about transport of the sound.

Background Audio—The audio signal outside of the digitally encoded/modulated part of the signal Audio Control Signal—The audio signal used to control a smart mobile device/appliance independent of its protocol. This could be anything from a nonrepeating one-way beacon to a bidirectional packetized acoustic modulation.

Overlying Transport Device—An object which is used to transport a digital audio message or beacon as described by this current invention which may use underlying technology not covered by the claims of this disclosure, to deliver a smart appliance audio control signal.

Digital Modulation—The transfer of a digital bit stream over an analog bandpass channel using a changing modulation protocol that can be demodulated back into the original digital message.

Static Beacon—A constant, near constant or repeating transmission of the same data used by mobile devices to identify location and use that information to identify mobile services relative to the location.

Combin(n,k)—The number of possible combinations of k uniquely selected objects out of n possible unique objects in an available selection set. In Mathematics this can be expressed in many ways. In terms of factorials, combin $(n,k)=n!/(n-k)!/k!$. However, when dealing with very large numbers and seeking an integral solution with the least or no division error, the best iterative method to calculate this number is combin$(n,k)=(n-0)/1*(n-1)/2*(n-2)/3* \ldots *(n-(k-1))/k$. This method of computation, iteratively from left to right, results in integer only intermediate results and therefore no division error due to rounding.

Digital Encoding—The transfer of a finite digital message over an analog bandpass channel using a constant audio signal for the duration of the message.

Trusted Signal—This is a digital signal coming from a secure and trusted site such as a retailer audio system or a fixed location iPad kiosk. A trusted signal is only one part of a secure transaction and contains an embedded digital modulation with or without multiple other live or prerecorded audio signals.

Trusted Client—Originator of a trusted signal. A Trusted Client is a device that is controlled by the retail business during a retail or other commerce transaction. A trusted client may be local to the transaction or a secure server on the internet which provides trusted information necessary to complete a transaction. This can be as simple as providing the correct time of the transaction or for providing a one-use code specific to the transaction. Where security is not an issue, all clients are trusted by default relative to the transaction.

Untrusted Client—Any receiver of a trusted signal by a device not in the direct control of the trusted signal broadcaster is by default an untrusted client until a transaction using a trusted signal and appropriate security measures have validated and therefore result in a secure transaction with the client. At that moment, and only with respect to the most recent secure transaction, the client becomes a trusted client.

Security key—A site specific graphic or alphanumeric code known only to trusted personnel which can autonomously or manually change as configured by trusted personnel.

Secret key—A key code embedded into, and not readily available to an untrusted client that is used to autonomously validate a transaction. The Secret Key is a security measure used to detect untrusted client software that has been tampered with and is therefore embedded deep in the untrusted client software in the binary executable form, making it nearly impossible for the user to extract.

Secure Transaction—A trusted broadcast signal paired with an untrusted receiver along with multiple security measures. These security measures may include but are not limited to time perishable, scrambled and/or encrypted messages embedded in the trusted signal, the use of Security Key as defined in this document, cloud based centralized signal processing and user photo IDs.

Mobile User Identification—For purpose of this current invention, this is a secure transaction used to securely identify the user for a high security purpose such as a mobile payment or access to a restricted location.

Mobile Location Pairing—An example of a transaction that may or may not be secure based on the needs of the trusted signal broadcaster and the users they serve. In either case, this refers to a mobile device using a trusted signal to identify its location at some resolution depending on the existing infrastructure of the broadcast equipment.

DETAIL DESCRIPTIONS OF THE INVENTION

The present invention involves a method for simplified secure mobile wireless communication and the resulting control of computing devices such as smart mobile devices using common existing audio infrastructure at public or private venues including but not limited to gas stations, food and movie drive-ins, audio gift, money and business cards, audio toys, retail stores, fast and full service restaurants, hospitals, doctor offices, military bases, buildings, stadiums and even high frequency digital radio, satellite or television broadcasts. Control of a smart mobile device includes but is not limited to the ability to invoke other native or web based applications, auto dial a number, add to the existing database of the mobile device such as contacts or URL favorites, automated SMS or MMS texting, automated social site aggregation, alarms and notification services.

The invention relies on the existence of digital audio modulation/demodulation software technology, as described in this disclosure, and the ability to integrate digital audio modulated signals into existing audio infrastructure in real or non-real time broadcast audio. The ability to integrate digitally modulated signals described in this invention can be as simple as plugging an iPad into a microphone or line feed of a broadcaster or playing the modulation live or into a microphone with sufficient audio sampling capabilities. The invention does not require the existence of other analog audio that it may be embedded with, only requires the existence of the working infrastructure. Unlike a competing PsychoAcoustic modulation technique, the modulation scheme in this disclosure can work in complete silence. It is the intention of this method to define a digital audio modulation that is easily mixed with any typical lower frequency audio source in real time.

Figure 2:
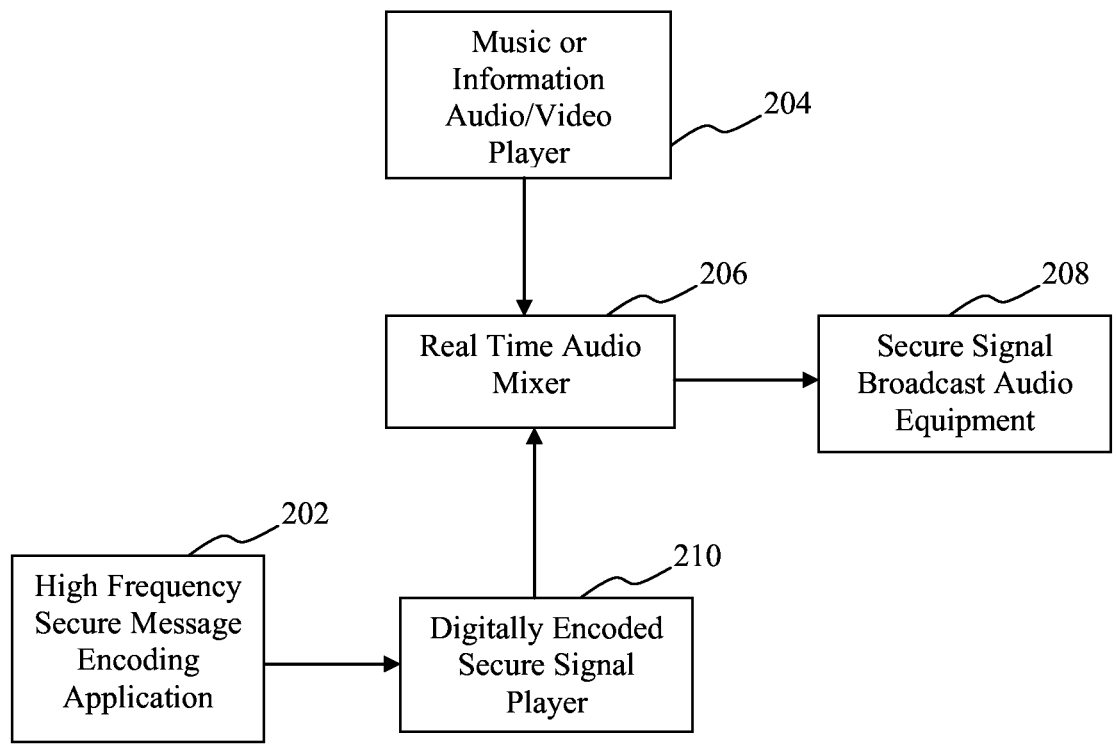
FIG. 2 illustrates an embodiment of using a mixing station to embed a digitally modulated signal with multiple prerecorded or live audio sources according to the present invention.
Figure 3:
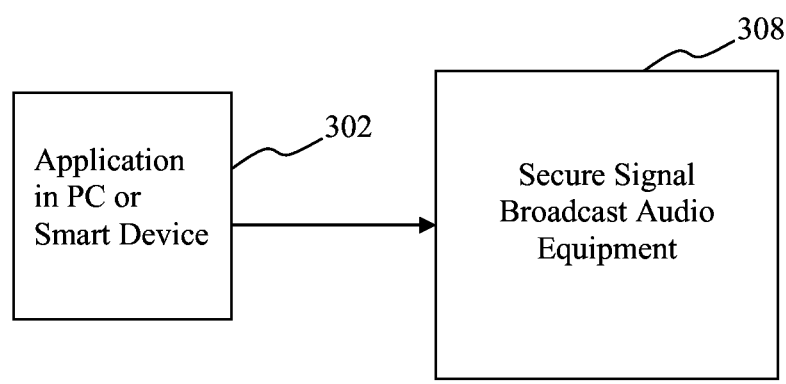
FIG. 3 illustrates an embodiment of using a smart device to embed a digitally modulated signal into prerecorded or live audio sources in real time without the need to change the legacy audio sources according to the present invention.

FIGS. 1-3 illustrate three possible ways to integrate digital audio modulated signals into existing audio infrastructure according to the present invention. Referring to FIG. 1, a high frequency secure message encoding application 102 is used to encode digital messages to generate digital audio encoded secure signals to be transmitted by a digital encoded secure signal player 110; then using a back office application 106 on a PC or a smart device, the digitally encoded secure signals can be integrated directly into existing audio files played in a music or information audio/video player 104 to create a trusted audio signal to be output to a secure signal broadcast audio equipment 108 for real or non-real time broadcasting. Different from FIG. 1, the back office application is replaced by a real-time audio mixer 206 in FIG. 2. As shown in FIG. 2, digitally encoded secure signals can be integrated directly into existing audio files and mixed/broadcast in real time such as over a high fidelity radio broadcast or music system in any venue from multiple sources using a fidelity mixing board. More simply, referring now to FIG. 3, using an application 302 in a PC or a smart device such as an iPad, digital messages can be integrated directly into existing audio files and mixed/broadcast in real time such as over a high fidelity radio broadcast or music system in any venue directly from within the iPad or PC application without the need for an external mixing board.

Figure 4:
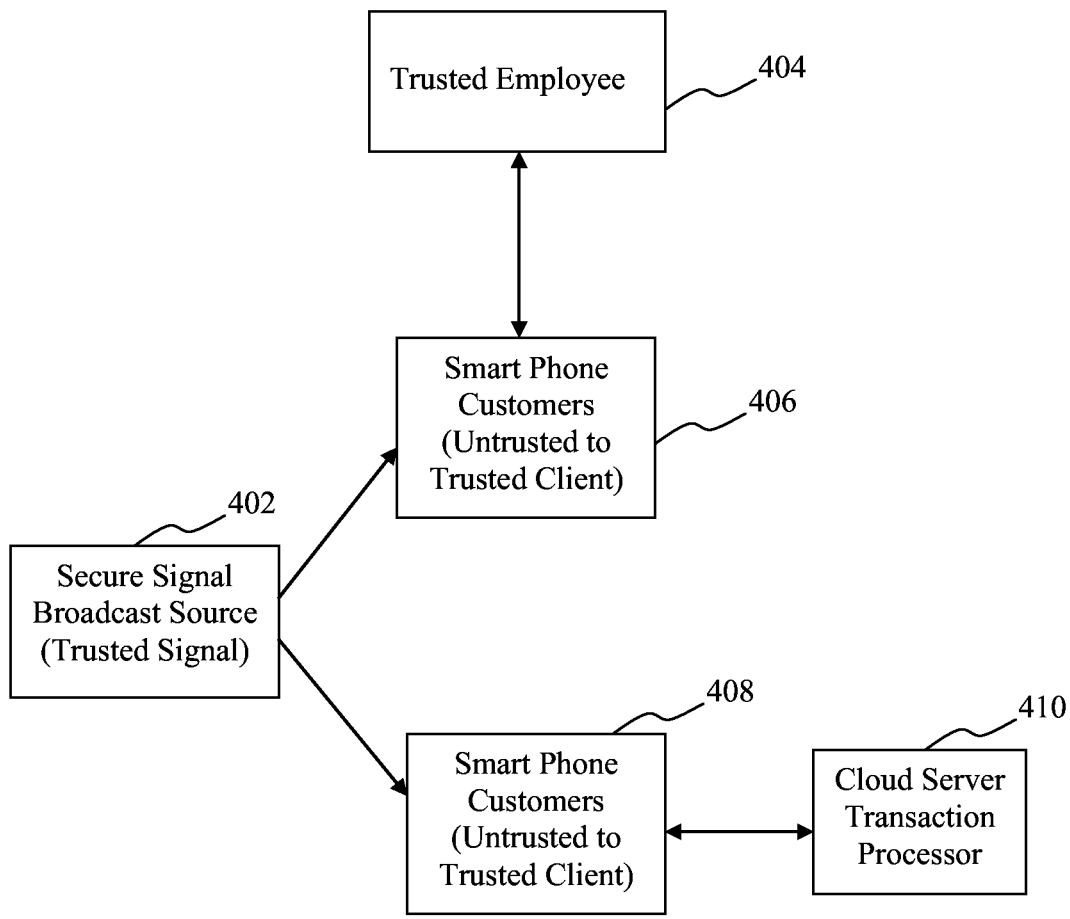
FIG. 4 illustrates an embodiment of processing received digital messages extracted from an audio source either locally or via a cloud server over the Internet according to the present invention.

In addition, the received digital message extracted from an audio source can be processed either locally or via a cloud server over the internet. Referring to FIG. 4, when a user instantiates an authorized mobile application capable of demodulating or otherwise recognizing the digitally embedded audio message via a trusted signal and comes within receiving range of the broadcast, the audio message will be processed either locally or via a central server over the internet and services specifically defined for the user by the broadcast owner will be permitted for the user.

In some instances, it is appropriate to encrypt the data as a secure transmission. It is very easy for someone to make an audio recording of the digital message and place that recording on the Internet for other hackers to use. However, even for one way transmissions, a message can be secured by using a secret key embedded in the software of both the trusted client broadcasting the message and the untrusted client receiving the message. Therefore, the current invention also involves a method for securely pairing an otherwise untrusted client device by location using digital modulated signals embedded on top of existing or commonly used audio transmission equipment transparently with normal audio or audio/video broadcasts in public or private venues. Every client in this process is initially an untrusted client since it is out of the control of the trusted equipment provided by the venue or broadcast medium. An untrusted client becomes a trusted client for the brief period of transaction validation, and only with respect to the validated transaction, before returning to the untrusted client state once the transaction is completed. An untrusted client becomes a trusted client by successfully processing a received trusted signal which contains optional security measures either directly or implied in the processing of the secured signal. It should be noted that in many cases the venue or broadcast media provider may have no intention or need to secure the transmission making secure transmissions optional to the overall scheme.

Security measures used to validate a transaction include but are not limited to the passing of a security key to the untrusted client which must firstly pass through a trusted internet server or be obtained via a secret key embedded in the client's application not accessible to the user, a pin provided by the user to the untrusted client device at the time of the transaction, visual validation of the security key by a trusted employee, electronic validation of the security key and/or transaction timestamps or other encoded messages.

Figure 5:
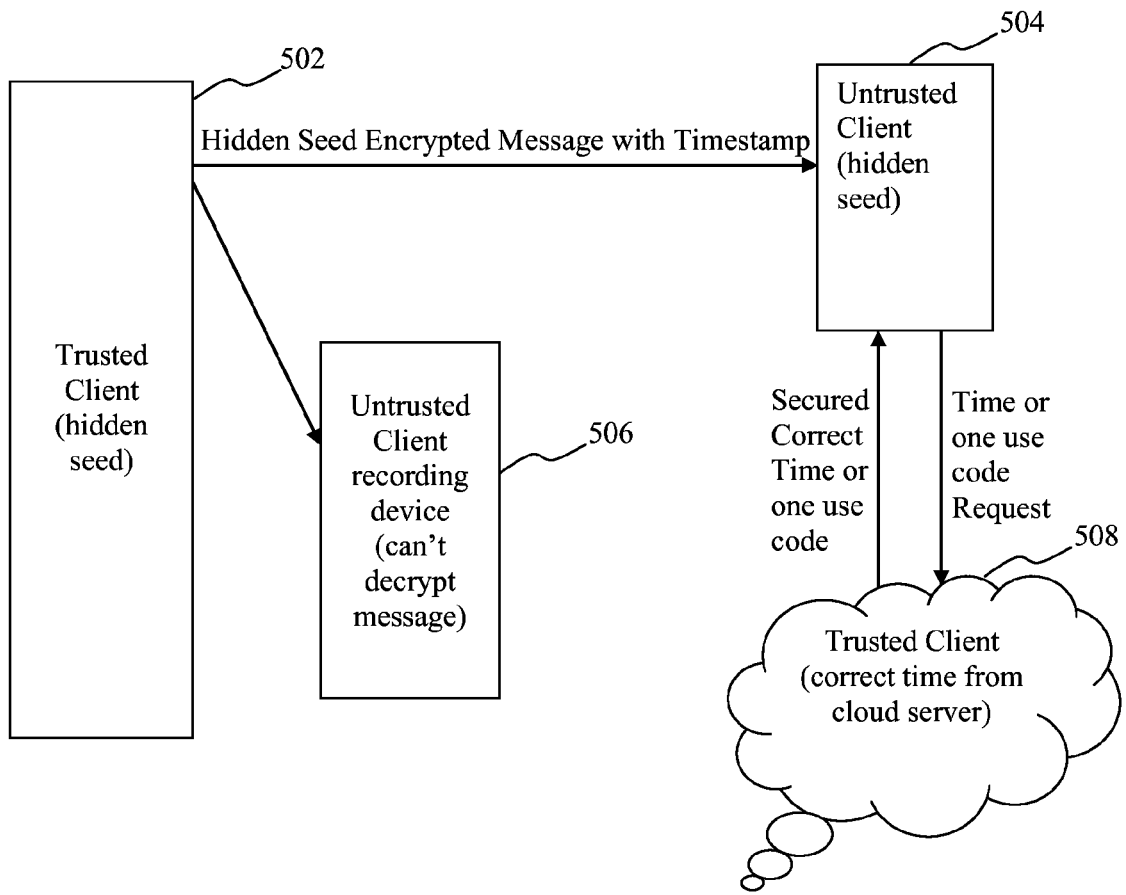
FIG. 5 illustrates a method of using a secret key and a third party trusted time stamp for one way secure message decryption according to the present invention.

For example, a secure hashing algorithm such as defined by the SHA1 standard uses a secret key and a seed along with the data to be transmitted to produce a secure transmission. Considering a time perishable message valid for a specific time period, as illustrated in FIG. 5, a timestamp with day resolution can be used to seed the SHA1 algorithm along with a secret key hidden inside the software of both trusted clients 502 and untrusted clients 504 so that only proprietary software can be used to decrypt the message and even then, only if the correct time stamp is used. For this invention, when encryption and time perishable data is required, the untrusted client will receive the encrypted message and will be required to get the correct time stamp from our server on the internet. This will inhibit the untrusted client 504 from merely artificially resetting the time on the smart phone to the time of the original transmission for the case where a recording of the message is used to defeat the security.

Figure 6:
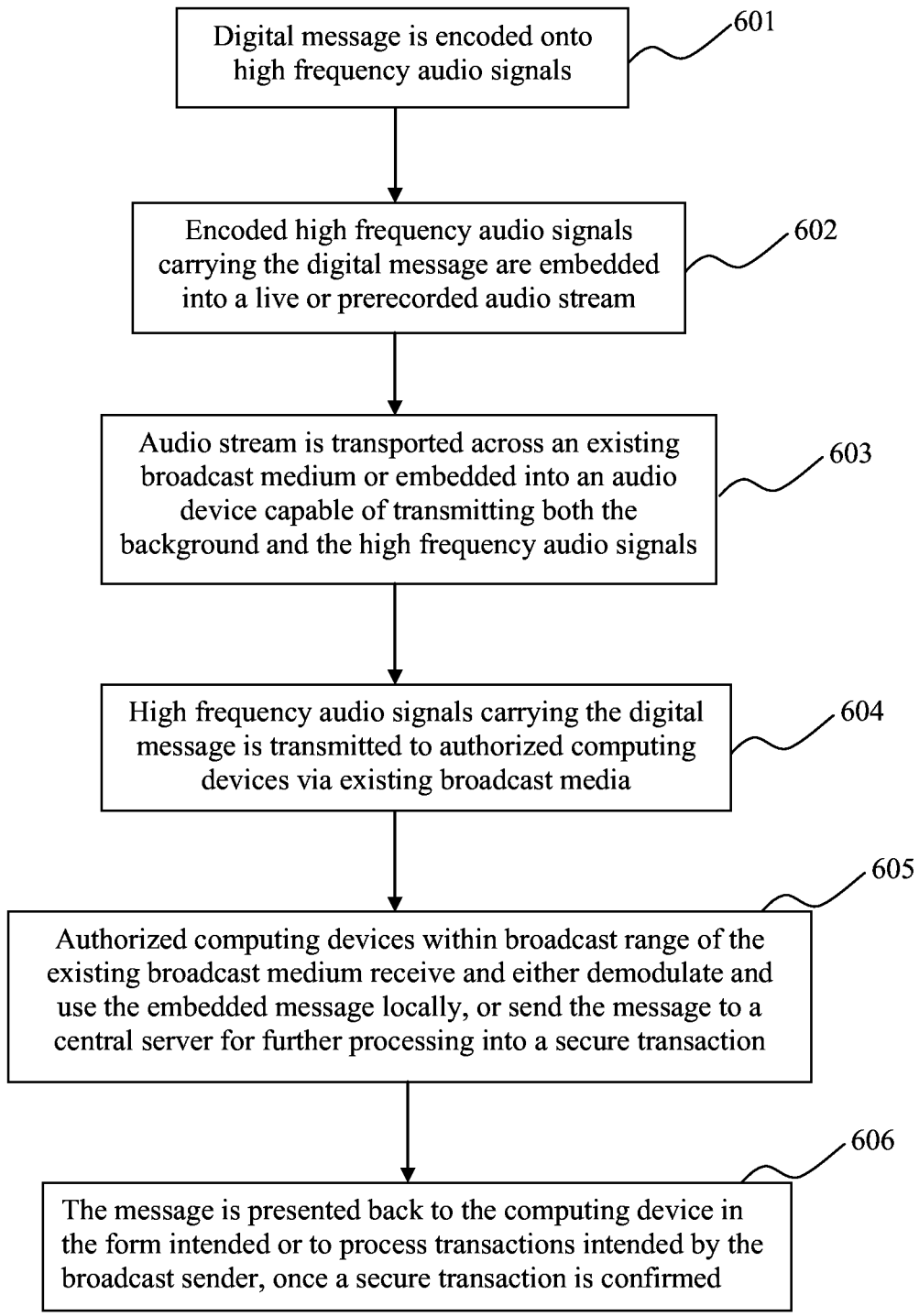
FIG. 6 is a flow chart simply illustrating a process of the method for controlling a computing device over existing broadcast acoustic channels according to the present invention.

In more detail, the method for controlling a computing device over existing broadcast audio channels according to the invention involves the following high-level steps as illustrated in FIG. 6. In step 601, a digital message is encoded or modulated onto high frequency audio signals. The digital message may be in the form of a repeated burst of the same or different information separated in time or of a continuous signal of static data. Then in step 602, a digital modulated or encoded beacon or packet signal carrying the digital message is embedded and mixed into a live or prerecorded audio stream. Then the audio stream is transported across an existing broadcast medium or embedded into a proprietary or off the shelf audio device capable of transmitting both the background (if any) and the digitally encoded/modulated audio in step 603. Next, the high frequency audio signals carrying the digital message is transmitted from a known location to expected computing devices that are authorized to receive and use the digital message via existing types of audio/video broadcasts (step 604). When a computing device capable of high frequency audio communication comes within broadcast range of the existing broadcast media and instantiates an authorized mobile application capable of demodulating or otherwise recognizing the digitally embedded audio message, the computing device (untrusted client) will receive and either demodulate and use the embedded message on the spot, or in some cases, send the message (demodulated or not) to a central cloud base server for processing into a secure transaction (step 605). Once a secure transaction is confirmed, the message can then be presented back to the mobile user in the form intended or to process transactions intended by the broadcast sender of the information (step 606). Please note that only when the message is sent to a central cloud base server for processing into a secure transaction, the step 606 is needed.

It is important to note that while other mobile applications have been developed simultaneously with this current invention to unidirectionally and in at least one case, bidirectionally, communicate with a mobile client using proprietary hardware designed by the application creators, the current invention is distinct, beyond the use of combinational mathematics for physical layer digital modulation, in that it is designed to overlay the digital modulation directly into existing or off the shelf audio systems capable of transporting both the background and digital audio transmissions. Known examples of the aforementioned systems include ShopKick, TagTile (recently purchased by FaceBook), PhotoCircle, and Naratte Zoosh, however, there may be several other examples. Another differentiator in this current invention is the use of the invention to not only communicate information to a receiving application, but also to use that information to control basic operations in the receiving mobile device as well, such as invoking other native and web based applications, autodialing phone numbers, auto SMS/MMS texting, auto browsing to a communicated domain on the internet, and even confirming the users attention and use on the mobile appliance where that is important to a local domain or venue such as a restaurant or shopping retailers for purposes of loyalty, analytics, rewards and/or coupons.

It should also be noted, that a secure transaction need not require security measures beyond the user possessing a device capable of properly receiving and demodulating a trusted signal. For example, a retailer may wish to simply broadcast a coupon locally to any and all customers without caring and in fact, encouraging, all to collect and use the coupon.

Examples of how this method may be used include but are not limited to the following examples.

1. Authenticating and processing gasoline and gas station purchases as a substitute or adjunct method to existing RFID technology now in place. Many pumps now broadcast high resolution audio/video right at the pump, so digitally modulated messaging can be broadcast together with the high resolution audio/video to a receiving mobile device. An example of RFID technology that this method would compete with or enhance is the Exxon Mobil Speedpass system.
2. Distributing Coupon/Loyalty points in any retail/restaurant outlet where the information could be broadcast store-wide over the existing loudspeaker audio system. This example is similar to the TagTile system but without the need for specialized hardware as required by their infrastructure.
3. Ticketless first come first serve line assignment at anything from hospital/doctor visits to DMV driver license locations. User automatically reserves a place in line simply by walking into the waiting room with their application running. The central server notifies the waiting room.
4. Commercial porting. This is a process whereby a Digital TV or Audio broadcast can send customer specific targeted ads and commercials directly to a smart device and remove them from the normal transmission appliance (TV, Car radio, Web Broadcast) as long as the user has their mobile device in range of the primary broadcast device so that it can "hear" the digital broadcast beacon and receive the commercials instead of the primary device.
5. Quick user location and information distribution inside of large areas such as malls, department stores, parking garages, theme parks etc.
6. Gaming promotions can now be automatically distributed and games can be more interactive by location within the venue where different audio broadcasts are present. For example, a user may be directed to a particular department of a department store before claiming a coupon or game piece, or a store with multiple locations may require a customer to visit all locations to collect different game pieces.
7. Users credit card or debit account associated with the user by simply walking into or near the venue.
8. Messages embedded in an entertainment or sports live or rebroadcast to synchronize or otherwise provide bonus content related to the broadcast event, polling, social interaction or advertising. For example, a TV sitcom or sporting broadcast could invite tweets, opinions or polling from viewers relevant to the portion of the show they are watching at the moment. Embedding acoustic markers directly into the broadcast that can be autonomously picked up by the viewers mobile smart appliance allows such information to be associated with specific broadcast content no matter when the content is actually viewed in time around the world. For instance, comments for the 2012 London Olympics women's gymnastics can be associated with a specific team, event or competitor without the viewer or the broadcast poll ever actually mentioning the team, event or competitor because the marker identifies these things. This is true even if the event is being rebroadcast because the markers remain in the audio content of the event indefinitely.
9. With more intelligent broadcasts involving a smart device such as an iPad used to broadcast inside a secure building for example, time perishable information may be encoded which allows or disallows visitation to all or sections of the building for the user. This may eliminate the need for security terminals and badges since the user can simply hold up their smart phone with authorization information as they pass security.
10. There are currently several flat film speaker technologies making their way onto the market place such as Piezoelectric Film (PVDF (Poly Vinylidene Fluoride)) and carbon nanotubes that have had difficulty penetrating the speaker market place both because of their initial cost but also because they do not operate very well in the lower audible frequency ranges and require special audio amplifiers. However, these solutions are well suited for transmission of high frequency acoustic modulations above 19 KHz where, at low volumes, they are outside of human ability to hear and therefore considered ultrasonic. By using these materials to broadcast digital acoustic modulations in movie posters, mall maps, wall advertisements, embedded in clothing or hidden in common objects such as lamp shades; several location based uses arise for controlling smart phones as described in this disclosure. Including but not limited to directing a movie-goer to a web site promoting a movie while the look at the poster, auto dialing emergency services from an Emergency Services poster in a living assistance residence or invoking a location relevant application for a restaurant and placing a name on their wait list while standing outside the restaurant looking at their outdoor menu.
11. This method is especially useful for the many TV infomercial, shopping networks, and polling shows such as American Idol, for example, where the viewing audience is asked to vote by dialing a number or issuing a text message. By broadcasting an acoustic digital message simultaneously with the broadcast, the viewing audience need not even read the number off the screen to dial or type in the text message needed to vote because this information is broadcast in sync with the show and the smart phone application can retrieve and dial or text the message for them.

In the foregoing description, it is mentioned that in order to implement the embedded digital in-band messaging via a sound channel, effective digital encoding is needed.

Many methods of open air/water digital wave encoding currently exist over many different wave transmission capable mediums. These methods typically involve sending synchronous or asynchronous burst of energy, which are one or all, a combination of time, frequency, amplitude or pulse modulation. For example, methods such as orthogonal frequency division multiplexing and differential phase shift keying are often used to avoid inter-symbol interference. In many cases, the goal is to transmit large amounts of data very quickly and compensate for environmental factors using very complex error correction schemes and in many cases, frequency and channel shifts.

In contrast to the above, the focus of this current invention is to provide a method suitable for transmission of relatively small amounts of data in a continuous or repeated manner using as little transmission energy as possible and thus reducing implementation cost and increasing transmission speeds. Even though the goal of this current invention involves relatively small amounts of data, the objective is to maximize the amount of data with the minimum amount of transmitted energy over a maximum distance.

In most transmission schemes, there is a direct relationship between a single portion, e.g frequency, pulse, amplitude etc., and its digital representation. Unlike these aforementioned methods of sending large amounts of data using forward error correction and channel shifting, this current invention accomplishes the somewhat different goal of sending relatively small amounts of data simply, by encoding the data using combinations of frequencies which must be looked at in their entirety in order to demodulate the signal into a digital package. In other words, unlike the vast majority of other typical digital wave encoding schemes, no single portion of the signal translates to a single bit of the demodulated resulting signal.

For any single transmission burst over a wave carrier, the number of frequencies transmitted in the burst, directly reduce the power of any single frequency received. For example, the transmitting of a single sinusoidal signal across a wave carrier results in a stronger signal at that specific frequency than the case of two frequencies being simultaneously transmitted together. Likewise, multiple signals can each reduce the signal strength potential of the transmitter across any particular medium at any specific transmission power. Further, a larger number of received frequencies must be demodulated individually using a DFT or FFT transform mechanism, resulting in an increase in complexity and work on the receiving end to distinguish more active frequencies, whereas fewer active frequencies are not only easier to identify in the environment but also faster to demodulate as a whole when the number of possible active frequencies are already known.

For this reason, the current invention also involves a method for digitally encoding a plurality of bits using a much lower number of frequencies out of a slightly higher number of possible frequencies in mathematical combinations that can be reversed back into an integral number on the receiving side of the transmission. The end result is a dramatically lower number of active frequencies as compared to bits transmitted as well as a significantly reduced number of monitored frequencies relative to decoding the frequency combination using a direct look up into a multidimensional table.

FIG. 7 illustrates a 4×4 DTMF array enumeration, i.e. a table of active verses inactive frequencies using a common 4×4 DTMF modulation, wherein totally 16 enumerated values are represented by 2 active frequencies selected out of 8 possible frequencies. In contrast, FIG. 8 illustrates an example of a combin(8,2) enumeration according to the present invention. Using the combin(8,2) modulation of the invention, all 28 possible combinations of 2 active frequencies out of 8 possible frequencies can represent totally 28 enumerated values as opposed to the 16 enumerated values of a DTMF table which also uses 2 active out of 8 possible frequencies in any transmission chunk.

However, there is a tradeoff between reducing the number of active frequencies (k) vs. reducing the number of monitored frequencies (n). This tradeoff is not important to the end result of this invention but rather to the environment to which it is deployed. For example, if one were trying to transmit 16 bits of data, combin(363,2)>2^16 offers the fewest number of active frequencies but requires a relatively large number of frequencies to scan which in turn requires processor cycles and time. In contrast, just adding as few as 3 more active frequencies results in combin(26, 5)>2^16 requires a much reduced number of monitored frequencies, from 363 to 26, with the same result of providing more than 2^16 values.

As an example of how this invention works, the transmission of 64 bit data over a high frequency acoustic open air channel using an Apple iPad and iPhone is illustrated with the following Transmission and Reception processes.

During the transmission process, a 64 bit value is firstly encoded with an audio signal composed of a combination of k frequency components out of n potential frequency values, where both k and n start at 0 and there is a fixed frequency separation between adjacent frequency values of the n potential frequency values. There are multiple mathematical ways as well as table driven methods to accomplish this, several of which can be found freely by searching the Internet. Next, using a base acoustic frequency, create a 64 bit mono RAW wave sample of the sum of the base+k frequencies as sinusoidal waves with equal amplitude applied to each frequency component. Note: since lower frequencies of sound tend to travel farther than higher frequencies, it may be useful to raise the amplitude slightly for each higher frequency to compensate for maximum distance. While it is possible to create an acoustic digital audio sample that is pulse width modulated to the speaker of a device, that is not a very efficient use of the device resources. A repeated playing of a single sample works much better. Sine wave and even multiple summed sine waves digitally emulated are very smooth and quiet or even silent at high frequencies to the human ear. However, it is best to now taper (e.g. attenuate) the ends of the sample down to or near 0 volume. Otherwise a very distinct click will be heard by the listener, not to mention the resulting harmonics that can reflect and distort otherwise good portions of the signal. A 3-5 ms linear attenuation works fine as does a sinusoidal tapering at a 6-10 ms period. Finally, the sample is sent to be mixed or played solo with the audio player in the device at the applications discretion.

Correspondingly, during the reception process, the receiver needs to merely collect enough audio signal required to properly distinguish between the n different frequencies given the known frequency separation since the transmitter is expected to be sending the signal continuously or with an acceptably high repetition. This means the receiver can sample at any rate comfortable to the application implementing the reception process. Between sample periods, the receiver should transform all n frequencies from the immediate sample. With respect to an iPad, the size of the data to be transmitted (resulting in selections for n and k), and the frequency separation used, the sample window to get clear separation of frequencies was set to 200 ms. However, since the signal is constant, if the work load is too great for the device, it is entirely possible to break the transforms from audio sample to individual frequencies into multiple sample periods. Once again, there are many ways and methods to transform analog sound samples into digital frequency strengths. FFT, DFT and Goertzel libraries and algorithm samples are abundant and freely available. Then, the receiver must use an algorithm to decide which are the active k frequencies selected out of the n frequencies transformed. This is not necessarily easy since higher frequencies are sometimes attenuated based on the capabilities of the transmitting speaker and its resonant frequency and an active lower frequency may have a sideband inactive frequency that appears stronger than an active frequency at the top of the band. Therefore the specific method to determine that a specific frequency component has high amplitude and thus distinguish the active k frequencies, while very important, is kept as a trade secret. Once the active k frequencies have been determined, they can now be fed back into an algorithm to convert the frequency combination back into an integral number. The conversion of the frequency combination into an integral number is also a varied and complex task with several solutions. It is also dependent on the specific encoding algorithm used by the transmitter. There are several methods to solve for the several possible solutions involving both mathematical and table implementations. The author of this current invention has implemented a combination mathematical and table driven solution to reduce this invention to practice. However, this invention is not dependant on any one conversion solution or implementation and it is therefore left out of this disclosure. However, it is obvious that whatever method used must match between transmitter and receiver and that these methods are capable of converting any set of k out of n frequencies into an integral number from 0 to combin(n,k).

Normally, a signal (even a hard wired digital signal), a bit if you will, is determined either by the presence of a wave or a voltage above a particular power level and for a particular length of time. Part of this is because that type of signaling is time based in that each bit sent takes a specific window of time and the receiver does not necessarily know how many bits will be sent. In contrast, with the above encoding method using mathematical combinations of the present invention, each data packet is precisely x bits wide and requires exactly k active frequencies. No matter what the value of the data packet is, it always requires k active frequencies out of n monitored frequencies within a predetermined frequency band. In the decoding process, the k frequency components having strongest signal strength can be identified out of the n monitored frequency components to determine the encoded data packet, without the need to look at any signaling thresholds to determine the presence or absence of a frequency component.

In addition, since audio signals may be attenuated as the frequency goes higher, an active frequency component at the high end of the frequency band may actually be weaker than a non-active frequency component at the low end of the frequency band, which may result in an error. This actually happens a lot as the receiver moves farther from the sender or the FFT sample time (FFT bin) decreases. In view of this problem, a possible solution is to break each x bit data packet into two x/2 bit data packets and also break the predetermined frequency band into two adjacent frequency sub-bands. Then the two x/2 bit data packets can be encoded with the two adjacent frequency sub-bands respectively. Breaking a single frequency band into two adjacent frequency bands reduces the risk of error because the active k frequency components in each band are relative to frequencies closer to themselves. This process also increases the reachable distances. Simply put, the data can be encoded into separate frequency based channels across which each channel is decoded using its own combin (n,k) decoding process.

In another aspect, still based on the above mathematical combination encoding method, but for high efficient usage of frequency bands, an improved encoding method called a high/low interleave combin(n,k) encoding method is proposed. A normal active high combin(n,k) encoding method is illustrated in FIG. 9, while the improved high/low interleave combin(n,k) encoding method is illustrated in FIG. 10.

Figure 9:
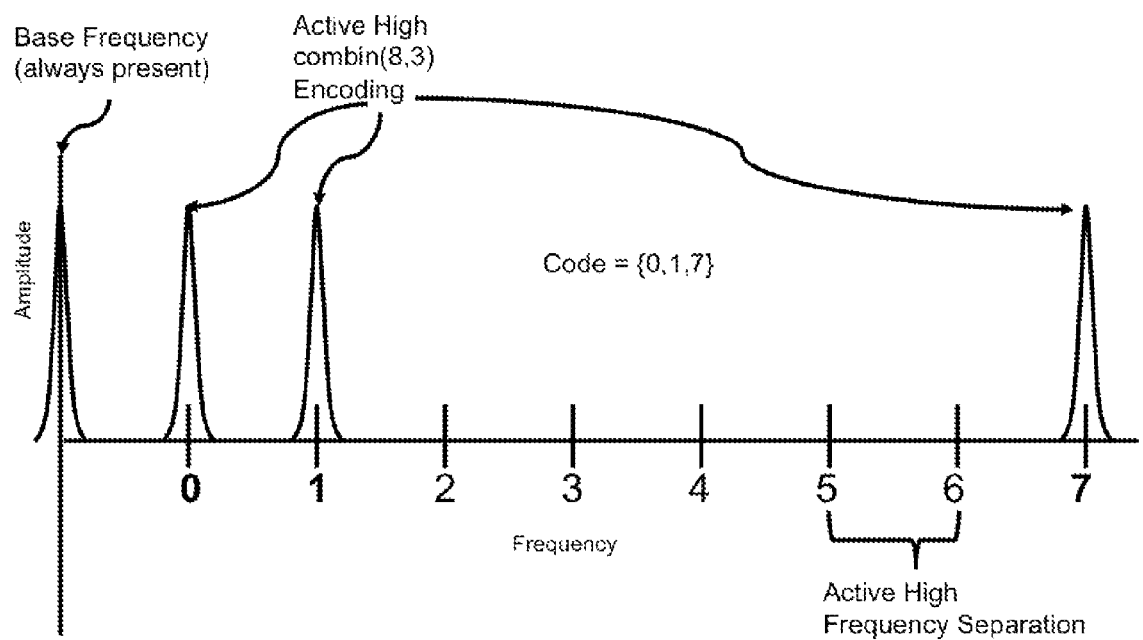
FIG. 9 schematically illustrates an example of a mathematical combin(n,k) encoding with k active high amplitude frequency components, according to an embodiment of the present invention.

As shown in FIG. 9, three active high amplitude frequency components (e.g. f0, f1 and f7) are selected from the totally eight monitored frequency components (e.g. referred to as f0 to f7) according to the concept of mathematical combination to represent a specific integral number of totally a number combin(8,3) of integral numbers. At the receiver, three active frequency components having highest amplitudes would be determined to identify the specific integral number encoded by the combination of the three active frequency components.

In practice, it may be desirable to increase the utilization efficiency of frequency bands. One possible solution is to divide the frequency separation by 2, get another n monitored frequency components (e.g. referred to as f0' to f7') in the same frequency band, and then use k active high amplitude frequency components out of the another n monitored frequency components to represent another specific integral number. In this way, the data carried in the same frequency band is doubled. However, this solution is not effective for practical use. It can work for only a very short distance and takes more time to decode. In more detail, the closer you place the frequencies together, the longer you have to sample the audio signal in the FFT algorithm (referred to as the bin size) to distinguish between two side by side frequencies. Also, even when you increase the bin size in order to detect frequencies that are closer together, sound drops off and is distorted very quickly over short distances in the air.

Figure 10:
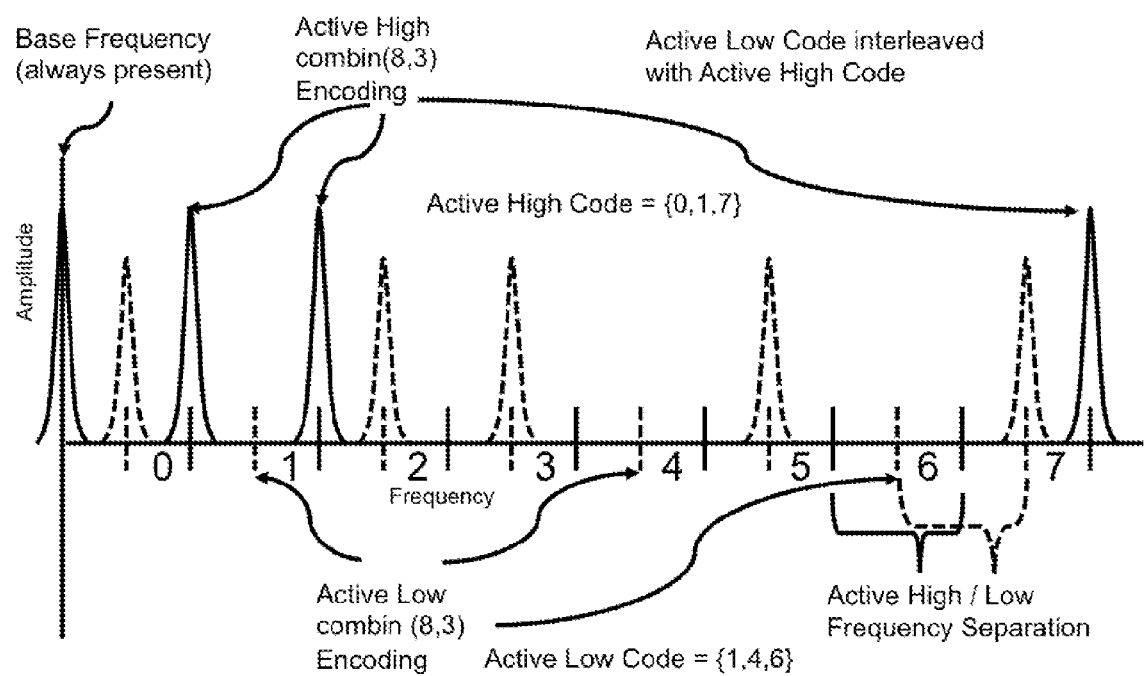
FIG. 10 schematically illustrates an example of a mathematical combin(n,k) encoding with k active high amplitude frequency components and another interleaved k active low frequency components, according to an embodiment of the present invention.

To address the problem, an encoding scheme that uses the absence of specific frequency components interleaved between the active high amplitude frequency components to encode another specific integral number within the same monitored frequency band is invented, and an example of such an encoding scheme is illustrated in FIG. 10. As can be seen from FIG. 10, (n−k) frequency components (e.g. f0', f2', f3', f5' and f7') interleaved between the original monitored frequency components as used in the normal active high combin(n,k) encoding method of FIG. 9 are activated with a certain amplitude. During the reception process, the receiver determines the absence of the k frequency components (e.g. f1', f4' and f6') by distinguishing and eliminating the (n−k) interleaved active frequency components (e.g. f0', f2', f3', f5' and f7'). Then the specific integral number represented by the absence of the k frequency components can be identified at the receiver.

The high/low interleave combin(n,k) encoding method as shown in FIG. 10 is a fairly effective way of encoding twice the data into the same frequency band without distorting the active high combin(n,k) encoding. The frequency separations for both the active high/low combin(n,k) encodings stay the same as that for the normal active high combin(n,k) encoding of FIG. 9. The presence of the interleaved sideband frequencies only strengthens the active high sideband frequencies yet not enough to present a false high signal for a high sideband frequency that is not active, and the inverse is true of the active high frequencies to their active low frequency neighbors.

In a broad sense, the present invention is a method for enabling a broad range of both server and client aware near field communications for the very broad mobile location based services market at a price point where it can gain viral market acceptance. These markets include but are not limited to, smart phone automated location based application and service invocation, social media and marketing applications, on-site unattended location specific real estate marketing (homes or commercial), Demographic collection (conventions, malls etc), personal guidance and instruction (museums, large buildings or even efficient shopping paths), unattended location based Sales and Marketing (Impulse, specials, e-coupons), location specific click thru information and advertising, along with all the existing current server aware markets, mobile electronic payment, restaurant, hotel and shopping check in, security and military or nonmilitary identification as well as any other market known or otherwise that requires wireless communications to complete a mobile transaction.

While the foregoing written description of the invention enables a person of ordinary but technically aware skill to make and use the invention in what is considered to be the best mode at present, a person of ordinary skill will understand and appreciate the existence of combinations and variants, or their equivalents of the specific embodiment, method, and examples contained herein. The present invention should therefore not be limited by the above described embodiment and examples or methods, but by all embodiments and methods within the scope and spirit of the invention.

What is claimed is:

1. A method for controlling a computing device over an existing broadcast media acoustic channel, wherein the computing device is capable of high frequency acoustic transmission, the method comprising steps of:

encoding a digital message by generating an audio signal composed of a set of high frequency components outside of a predefined frequency range;

embedding the audio signal carrying information of the digital message into an audio stream;

transmitting the audio stream over the existing broadcast media acoustic channel;

executing an authorized application on the computing device to extract and decode the embedded digital message when the computing device is within a broadcast range of the existing broadcast media acoustic channel;

the audio signal is composed of k frequency components;

n frequency components within a predetermined frequency band are monitored for decoding;

the digital message is encoded with the audio signal composed of any k frequency components selected out of the n monitored frequency components in accordance with mathematical combinations;

during a decoding process, k frequency components having highest signal magnitudes are distinguished from the n monitored frequency components and the digital message corresponding to a combination of the k frequency components selected out of the n monitored frequency components is identified;

the digital message includes a number of x bit data packets, each of which is broke into two x/2 bit data packets;

the predetermined frequency band is broke into two adjacent frequency sub-bands; and the two x/2 bit data packets of each x bit data packet are encoded with frequency components within the two adjacent frequency sub-bands respectively.

2. The method for controlling a computing device over an existing broadcast media acoustic channel of claim 1, wherein the digital message is a secured message;

the computing device is initially in an untrusted status in which the computing device is out of control of the existing broadcast media acoustic channel;

the computing device turns into a trusted status for a period of transaction validation and only with respect to a validated transaction; and the computing device returns to the untrusted status once the validated transaction is completed.

3. The method for controlling a computing device over an existing broadcast media acoustic channel of claim 2, wherein the computing device turns into the trusted status after successfully processing a secured digital message.

4. The method for controlling a computing device over an existing broadcast media acoustic channel of claim 1, wherein the encoded audio signal is embedded into the live or prerecorded audio stream by a real-time audio mixer.

5. The method for controlling a computing device over an existing broadcast media acoustic channel of claim 1, wherein the existing broadcast media audio channel is provided by common existing audio infrastructure at public or private venues including gas stations, food and movie drive-ins, audio gift, money and business cards, audio toys, retail stores, fast and full service restaurants, hospitals, doctor offices, military bases, buildings, stadiums and even high frequency digital radio, satellite or television broadcasts.

6. The method for controlling a computing device over an existing broadcast media acoustic channel of claim 1, further comprising:

sending the extracted digital message to a central cloud base server over the Internet for process.

7. The method for controlling a computing device over an existing broadcast media acoustic channel of claim 1, the computing device is a smart mobile device capable of high frequency bidirectional acoustic transmission.

8. The method for controlling a computing device over an existing broadcast media acoustic channel of claim 1, the digital message is used for communicating information to the authorized application or the computing device.

9. The method for controlling a computing device over an existing broadcast media acoustic channel of claim 1, the digital message is used to control operations in the computing device, such as invoking other native and web based applications, autodialing phone numbers, auto Short Message Service or Multimedia Message Service texting, auto browsing to a communicated domain on the internet, and even confirming user attention and use on the computing device where that is important to a local domain or venue such as a restaurant or shopping retailers for purposes of loyalty, analytics, rewards and/or coupons.

10. The method for controlling a computing device over an existing broadcast media acoustic channel of claim 1, wherein the digital message is in the form of a repeated burst of the same or different information separated in time or of a continuous signal of static data.

11. The method for controlling a computing device over an existing broadcast media acoustic channel of claim 1, wherein a frequency separation between any two adjacent frequency components of the n monitored frequency components keeps same and each frequency component of the audio signal has equal predefined signal magnitude.

12. The method for controlling a computing device over an existing broadcast media acoustic channel of claim 1, wherein another n frequency components respectively interleaved between any two adjacent frequency components of the n monitored frequency components are monitored for decoding;

another audio signal composed of (n−k) frequency components each having equal predefined signal magnitude selected out of the another n frequency components is generated for encoding another digital message;

both the another audio signal and the audio signal composed of the k frequency components selected out of the n monitored frequency components are embedded into the audio stream for simultaneously transmitting the digital message and the another digital message over the existing broadcast media acoustic channel; and during the decoding process, k frequency components having lowest signal magnitudes are distinguished from the another n monitored frequency components and the another digital message corresponding to a combination of the k frequency components selected out of the another n monitored frequency components is identified.

13. A method for controlling a computing device over an existing broadcast media acoustic channel, wherein the computing device is capable of high frequency acoustic transmission, the method comprising steps of:

encoding a digital message by generating an audio signal composed of a set of high frequency components outside of a predefined frequency range;

embedding the audio signal carrying information of the digital message into an audio stream;

transmitting the audio stream over the existing broadcast media acoustic channel; and executing an authorized application on the computing device to extract and decode the embedded digital message when the computing device is within a broadcast range of the existing broadcast media acoustic channel, wherein the audio signal is composed of k frequency components;

n frequency components within a predetermined frequency band are monitored for decoding;

the digital message is encoded by generating the audio signal composed of any k frequency components selected out of the n monitored frequency components in accordance with mathematical combinations;

during a decoding process, k frequency components having highest signal magnitudes are distinguished from the n monitored frequency components and the digital message corresponding to a combination of the k frequency components selected out of the n monitored frequency components is identified;

another n frequency components respectively interleaved between any two adjacent frequency components of the n monitored frequency components are monitored for decoding;

another audio signal composed of (n−k) frequency components each having equal predefined signal magnitude selected out of the another n frequency components is generated for encoding another digital message;

both the another audio signal and the audio signal composed of the k frequency components selected out of the n monitored frequency components are embedded into the audio stream for simultaneously transmitting the digital message and the another digital message over the existing broadcast media acoustic channel; and during the decoding process, k frequency components having lowest signal magnitudes are distinguished from the another n monitored frequency components and the another digital message corresponding to a combination of the k frequency components selected out of the another n monitored frequency components is identified.

14. The method for controlling a computing device over an existing broadcast media acoustic channel of claim 13, wherein a frequency separation between any two adjacent frequency components of the n monitored frequency components keeps same and each frequency component of the audio signal has equal predefined signal magnitude.

15. The method for controlling a computing device over an existing broadcast media acoustic channel of claim 13, wherein the digital message is in the form of a repeated burst of the same or different information separated in time or of a continuous signal of static data.

16. The method for controlling a computing device over an existing broadcast media acoustic channel of claim 13, wherein the digital message is a secured message;

the computing device is initially in an untrusted status in which the computing device is out of control of the existing broadcast media acoustic channel;

the computing device turns into a trusted status for a period of transaction validation and only with respect to a validated transaction; and the computing device returns to the untrusted status once the validated transaction is completed.

17. The method for controlling a computing device over an existing broadcast media acoustic channel of claim 16, wherein the computing device turns into the trusted status after successfully processing a secured digital message.

\* \* \* \* \*